(12) United States Patent
Stern

(10) Patent No.: US 9,874,949 B2
(45) Date of Patent: Jan. 23, 2018

(54) STYLUS FOR A DIGITIZER SYSTEM

(71) Applicant: Microsoft Technology Licensing, LLC, Redmond, WA (US)

(72) Inventor: Yuval Stern, Even-Yehuda (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/188,931

(22) Filed: Feb. 25, 2014

(65) Prior Publication Data

US 2014/0240298 A1    Aug. 28, 2014

Related U.S. Application Data

(60) Provisional application No. 61/768,562, filed on Feb. 25, 2013.

(51) Int. Cl.
*G06F 3/033* (2013.01)
*G06F 3/0354* (2013.01)
*G06F 3/038* (2013.01)

(52) U.S. Cl.
CPC ........ *G06F 3/03545* (2013.01); *G06F 3/0383* (2013.01)

(58) Field of Classification Search
CPC ............................ G06F 3/03545; G06F 3/0383
See application file for complete search history.

(56) References Cited

U.S. PATENT DOCUMENTS

| | | | |
|---|---|---|---|
| 5,028,745 A | 7/1991 | Yamanami et al. | |
| 5,218,173 A | 6/1993 | Garwin et al. | |
| 5,349,139 A * | 9/1994 | Verrier et al. | ............. 178/19.04 |
| 5,528,002 A | 6/1996 | Katabami | |
| 5,576,502 A | 11/1996 | Fukushima et al. | |
| 6,417,846 B1 * | 7/2002 | Lee | ................................ 345/173 |
| 7,292,229 B2 | 11/2007 | Morag et al. | |
| 7,372,455 B2 | 5/2008 | Perski et al. | |
| 7,646,379 B1 | 1/2010 | Drennan et al. | |

(Continued)

FOREIGN PATENT DOCUMENTS

| | | |
|---|---|---|
| CN | 1679078 | 10/2005 |
| CN | 101133382 | 2/2008 |

(Continued)

OTHER PUBLICATIONS

International Search Report and the Written Opinion Dated Jun. 19, 2014 From the International Searching Authority Re. Application No. PCT/IL2014/050192.

(Continued)

*Primary Examiner* — Matthew Sim

(57) ABSTRACT

A signal emitting stylus for operation with a digitizer system includes a resonant circuit including a first capacitor and an inductor, the circuit operative to alternate between receiving a wirelessly transmitted first signal and generating electrical field; a controller and a power source. The controller operates the resonant circuit in a receive mode for receiving the first signal, decodes the received first signal and switches operation of the resonant circuit to a transmit mode for generating the electrical field and coupling the electrical field to a digitizer system in response to detecting the first signal. The power source powers generation of the electrical field.

20 Claims, 8 Drawing Sheets

(56) References Cited

U.S. PATENT DOCUMENTS

| | | | |
|---|---|---|---|
| 8,089,475 B2 * | 1/2012 | Ito | G06F 3/03545 178/18.06 |
| 8,481,872 B2 | 7/2013 | Zachut | |
| 8,536,471 B2 | 9/2013 | Stern et al. | |
| 2001/0001430 A1 * | 5/2001 | Ely | G01D 5/2073 178/18.03 |
| 2003/0217871 A1 * | 11/2003 | Chao | G06F 3/046 178/18.01 |
| 2004/0095333 A1 * | 5/2004 | Morag et al. | 345/173 |
| 2008/0128180 A1 * | 6/2008 | Perski et al. | 178/18.03 |
| 2010/0085325 A1 * | 4/2010 | King-Smith | G06F 3/03545 345/174 |
| 2012/0306824 A1 * | 12/2012 | Horie | G06F 3/03545 345/179 |

FOREIGN PATENT DOCUMENTS

| | | |
|---|---|---|
| CN | 101587414 | 11/2009 |
| EP | 0573136 | 12/1993 |
| EP | 0694865 | 1/1996 |
| EP | 0718750 | 6/1996 |
| EP | 0737933 | 10/1996 |
| WO | WO 2004/021328 | 3/2004 |
| WO | WO 2005/020057 | 3/2005 |
| WO | WO 2006/059336 | 6/2006 |
| WO | WO 2011/058562 | 5/2011 |

OTHER PUBLICATIONS

International Preliminary Report on Patentability Dated Sep. 3, 2015 From the International Bureau of WIPO Re. Application No. PCT/IL2014/050192.
Supplementary European Search Report and the European Search Opinion Dated Oct. 6, 2016 From the European Patent Office Re. Application No. 14754003.3.
Notification of Office Action and Search Report Dated May 3, 2017 From the State Intellectual Property Office of the People's Republic of China Re. Application No. 201480009090.9 and Its Summary Into English. (12 pages).

* cited by examiner

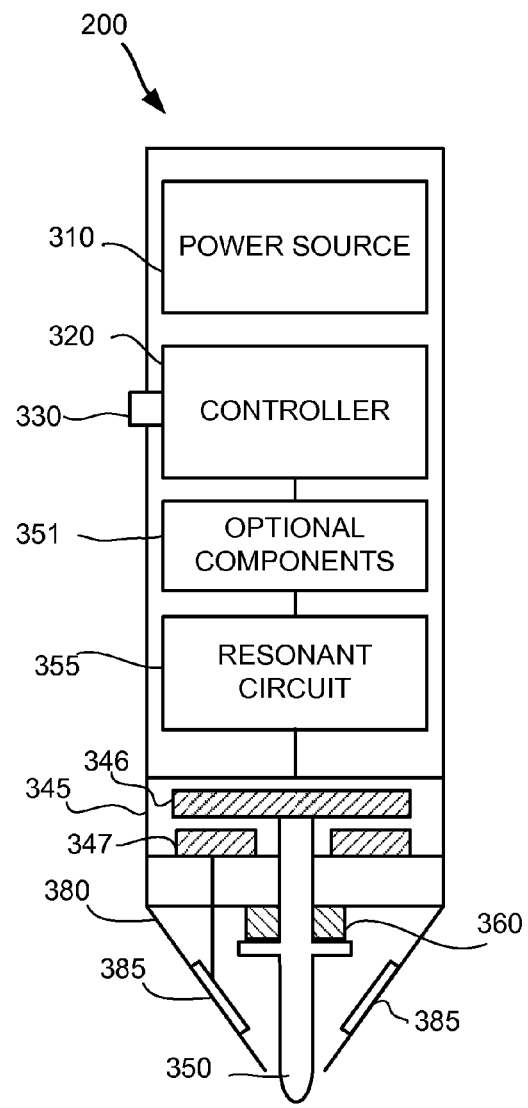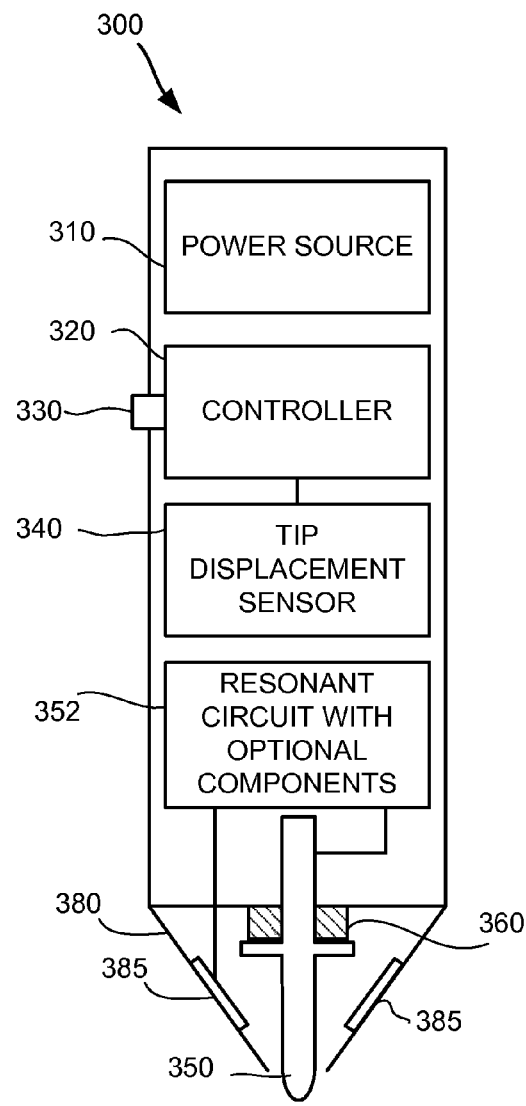
FIG. 3                    FIG. 4

STYLUS FOR A DIGITIZER SYSTEM

RELATED APPLICATION

This application claims the benefit of priority under 35 USC 119(e) of U.S. Provisional Patent Application No. 61/768,562 filed Feb. 25, 2013, the contents of which are incorporated herein by reference in their entirety.

FIELD AND BACKGROUND OF THE INVENTION

The present invention, in some embodiments thereof, relates to an electromagnetic signal-emitting stylus used for interaction with a digitizer system and more particularly, but not exclusively to an active and/or self powered stylus.

Styluses are known in the art for use with digitizer systems such as with digitizer systems that are integrated with a display screen, e.g. a touch screen. Stylus position is sensed by the digitizer system and used to provide input to a computing device associated with the display screen. Position of the stylus is typically correlated with virtual information displayed on the display screen. Inputs originating from the stylus are typically interpreted as user commands or user inputs for commands. Typically, a signal emitted by the stylus is detected by the digitizer system both while a writing tip of the stylus is touching and hovering over a detection surface of the digitizer system.

U.S. Pat. No. 7,292,229 entitled "Transparent Digitiser," assigned to N-Trig Ltd., the contents of which is incorporated herein by reference, describes passive stylus that is a stylus with no internal power source and no wired connection for interaction with a digitizer sensor. It is described that the stylus is energized by a triggering pulse provided with an excitation coil which surrounds the sensor and thereby energizes the stylus resonance circuit. An advantage of external excitation is that it inherently provides synchronization of the stylus to the digitizer, since both components are aware of the excitation pulse timing. It is stated that in alternative embodiments, the stylus may be internally powered using a battery. The stylus further comprises a touch switch and a right click switch. Each of the touch switches when closed have the effect of altering the resonant frequency so that the digitizer system can recognize touch and right click.

U.S. Pat. No. 8,536,471 entitled "Pressure Sensitive Stylus for a Digitizer," assigned to N-Trig Ltd., the contents of which is incorporated herein by reference, describes a pressure sensitive stylus with a movable tip that recedes within a housing of the stylus in response to user applied contact pressure and an optical sensor enclosed within the housing for optically sensing the displacement of the tip and for providing output in response to the sensing. There is also described a capacitive based displacement sensor including variable capacitor with one conductive plate in physical communication with stylus tip so that it moves in accordance with the stylus tip movement.

U.S. Pat. No. 8,481,872 entitled "Digitizer, Stylus and Method of Synchronization Therewith," assigned to N-Trig Ltd., the contents of which is incorporated herein by reference, describes a method for operating a digitizer with an autonomous asynchronous stylus includes sampling outputs from a digitizer, detecting from the outputs at least one pulsed signal transmitted from an autonomous asynchronous stylus at a defined rate, determining a location of the stylus interaction with respect to the digitizer, and tracking stylus interaction with the digitizer over subsequent pulsed signals transmitted from the stylus.

SUMMARY OF THE INVENTION

According to an aspect of some embodiments of the present invention there is provided an active stylus that includes a resonant circuit, a power source and a controller that operates to selectively connect the resonant circuit to the power source. According to some embodiments of the present invention, the resonant circuit is operated both as a receiver and a transmitter. According to some embodiments of the present invention, the resonant circuit is operative to pick-up a synchronization and/or triggering signal emitted by a digitizer system while in receive mode and to transmit a signal powered by the power source during a transmit mode.

According to an aspect of some embodiments of the present invention there is provided a digitizer system including a conductive ring and/or coil through which a magnetic flux is generated. According to some embodiments of the present invention, the digitizer system produces and controls a signal transmitted on the conductive ring that produces the magnetic flux. Typically, the magnetic flux is adapted to be picked-up by the stylus. Optionally, the digitizer system imposes signal modulations on the signal transmitted on the conductive ring for conveying commands and/or parameters and/or information to the stylus(es). Typically, a synchronization and/or triggering signal is transmitted on the conductive ring to prompt the stylus to emit a signal for position detection and/or a signal associated with additional information. According to some embodiments of the present invention, the digitizer system synchronizes sampling output from the digitizer sensor with transmission of the synchronization signal on the conductive ring.

According to an aspect of some embodiments of the present invention there is provided a signal emitting stylus for operation with a digitizer system, the stylus comprising: a resonant circuit including a first capacitor and an inductor, the circuit operative to alternate between receiving a wirelessly transmitted first signal and generating electrical field; a controller for operating the resonant circuit in a receive mode for receiving the first signal, for decoding the received first signal and for switching operation of the resonant circuit to a transmit mode for generating the electrical field and coupling the electrical field to a digitizer system in response to detecting the first signal; and a power source for powering generation of the electrical field.

Optionally, the controller is operative to control modulation of the electrical field.

Optionally, the stylus includes a plurality of capacitors, each connected to the resonant circuit with a switch and wherein the controller is operative to controller state of the each of the switches.

Optionally, the stylus includes a variable capacitor that varies in response to displacement caused by pressure applied to a writing tip of the stylus.

Optionally, the variable capacitor is connected to the resonant circuit by a switch controlled by the controller.

Optionally, the stylus includes a differential amplifier and wherein the controller is operative to connect the differential amplifier to output of the resonant circuit during a receive mode of the circuit.

Optionally, the stylus includes a voltage source for powering the resonant circuit and wherein the controller is operative to connect the voltage source to the resonant circuit during a transmit mode of the circuit.

Optionally, the stylus includes a pressure sensor and wherein the controller is operative to encode the second signal with output detected from the pressures sensor.

Optionally, the stylus includes a user actuated button and wherein the controller is operative to encode the second signal with information regarding the state of the button.

Optionally, the controller is operative to decode information encoded on the first signal and to modulate the second signal in accordance with the information decoded.

According to an aspect of some embodiments of the present invention there is provided a method for operating a stylus for operation with a digitizer system, the method comprising: providing a resonant circuit in a stylus; providing a power source in the stylus; operating the resonant circuit in a receive mode; receiving a first signal from a digitizer system during the receive mode; switching operation of the resonant circuit to a transmit mode; power the resonant circuit with the power source included in the stylus; and transmit a second signal from the stylus to the digitizer system.

Optionally, the method includes decoding information encoded in the first signal.

Optionally, the method includes altering the frequency of transmission in response to the information decoded from the first signal.

Optionally, the method includes modulating the second signal in accordance with the information.

Optionally, the method includes modulating the second signal with information regarding a parameter of operation of the stylus.

Optionally, the modulating includes digital encoding.

Optionally, the modulating is achieved by adding capacitance to the resonant circuit.

Optionally, the method includes adding capacitance to the resonant circuit in response to detected drifting due to temperature changes.

According to an aspect of some embodiments of the present invention there is provided a digitizer system for operation with a signal emitting stylus, the digitizer system comprising: a grid based capacitive digitizer sensor patterned on at least one substrate; a conductive loop patterned on the at least one substrate of the digitizer sensor; and a stylus control unit operative to transmit a signal on the conductive loop so as to generate a magnetic flux and to initiate detection of a stylus signal on the grid based capacitive digitizer sensor at a predefined period after transmission of the signal on the conductive loop.

Optionally, the signal transmitted on the conductive loop is modulated with information.

Optionally, the information is a command to the stylus.

Optionally, the conductive loop is patterned from a same material as the capacitive digitizer sensor.

According to an aspect of some embodiments of the present invention there is provided a method for operating a digitizer system with a signal emitting stylus, the method comprising: providing a grid based capacitive sensor; generating a signal on a conductive loop associated with the digitizer system, wherein the signal generated produces a magnetic flux that is significantly weaker than that required for powering transmission of a stylus; initiating at a predefined period after transmission of the signal on the conductive loop detection of a stylus signal on the grid based capacitive digitizer sensor; and determining position of the stylus in response to the detection.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 3 is a simplified block diagram of an exemplary stylus including a pressure sensor with analog output in accordance with some embodiments of the present invention;

FIG. 4 is a simplified block diagram of an exemplary stylus including a sensor with digital output in accordance with some embodiments of the present invention;

Figure 1:
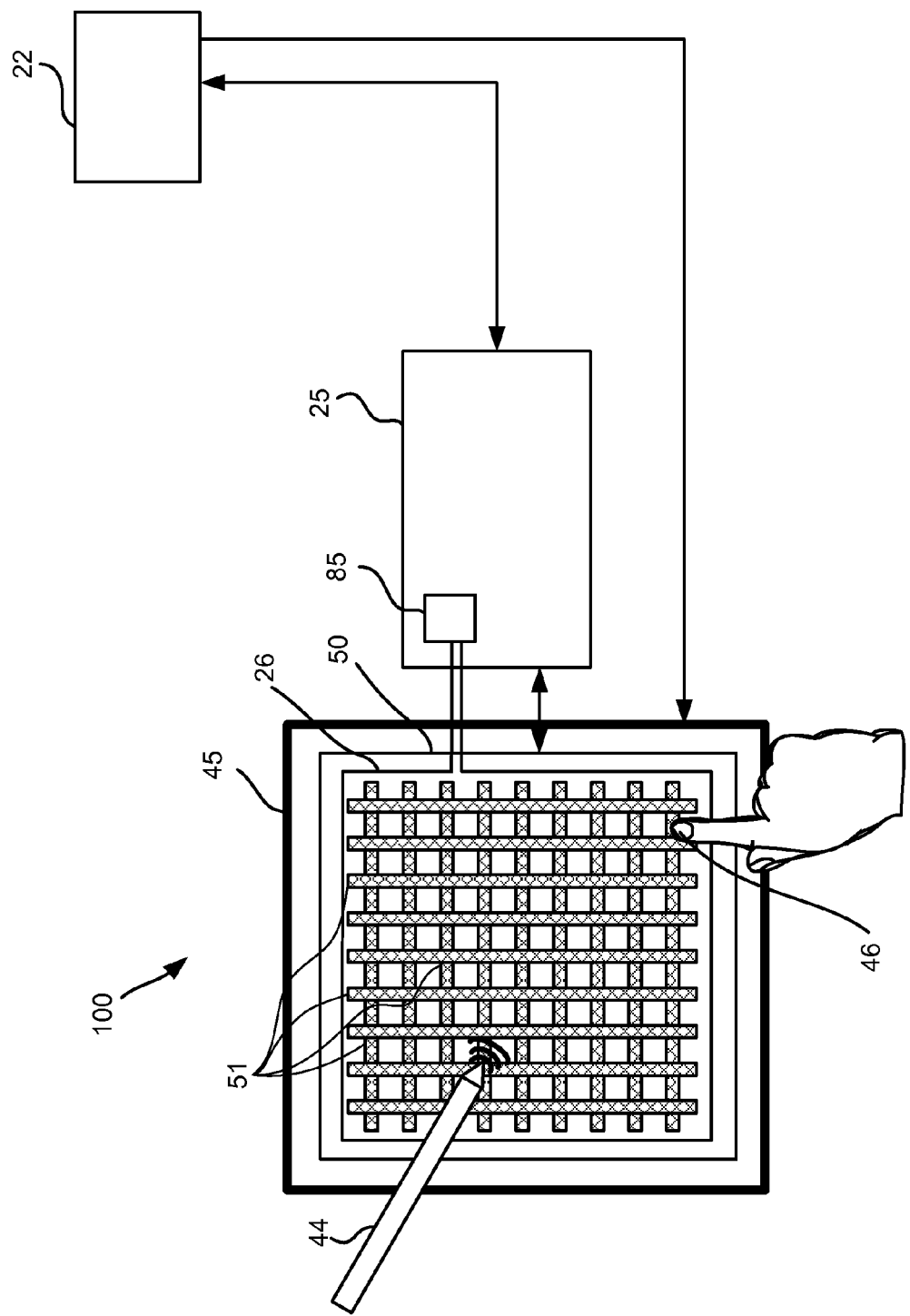
FIG. 1 is a simplified block diagram of an exemplary computing device in accordance with some embodiments of the present invention.

DESCRIPTION OF SPECIFIC EMBODIMENTS
OF THE INVENTION

The present invention, in some embodiments thereof, relates to an electromagnetic signal emitting stylus used for interaction with a digitizer system and more particularly, but not exclusively to an active and/or self powered stylus.

As used herein the term 'active stylus' and 'self-powered stylus' refers to a stylus whose transmission is powered and/or power-assisted with a power source included in the stylus, e.g. a battery.

According to some embodiments of the present invention, a stylus includes a resonant circuit that is adapted to alternate between a receive mode to receive a signal and/or a command from an outside source, e.g. a digitizer system, and a transmit mode to transmit a signal and/or command to the digitizer system or other outside system external to the stylus, e.g., to a digitizer system. According to some embodiments of the present invention, the stylus includes a DC power source, e.g. one or more batteries used to power transmission with the resonant circuit. According to some embodiments of the present invention, the DC power source provides for transmitting a relatively high amplitude signal compared to an amplitude level of a signal picked up by the resonant circuit when operating as a receiving circuit. Typically, a same inductor is used for both receiving and transmitting a signal with the stylus. Typically, the stylus includes a controller that controls switching between a receive mode and a transmit mode and also controls signal output of the stylus.

According to some embodiments of the present invention, the controller operates the resonant circuit of the stylus as a receiving circuit by default and/or during an idle period of the stylus, and switches operation of the resonant circuit to a transmit mode in response to the resonant circuit picking up a triggering, synchronization signal and/or command signal from an outside source, e.g. the digitizer system. According to some embodiments of the present invention, the signal picked up by the resonant circuit is detected by the controller of the stylus. Optionally, the controller decodes information embedded in the signal picked up by the resonant circuit. Typically, decoded information is interpreted as commands.

According to some embodiments of the present invention, the controller switches operation of the resonant circuit to a transmit mode in response to detecting a valid triggering, synchronization signal and/or command signal. Typically, during a transmit mode, the controller controls powering of the transmission by connecting the resonant circuit to a power source.

According to some embodiments of the present invention, the stylus includes a pressure sensor for detecting pressure applied on a writing tip of the stylus and/or for discriminating between a stylus touching and hovering over a sensing surface of the digitizer system. In some exemplary embodiments, the pressure sensor includes a variable capacitor that varies in response to displacement of the writing tip. According to some embodiments of the present invention, the controller communicates information provided by the pressure sensor to the digitizer system by connecting the variable capacitor to the resonant circuit during a transmit mode of the circuit so that the transmission frequency is altered in response to pressure. Alternatively, output from the pressure sensor is detected by the controller and the detected information is then digitally encoded in the signal transmitted by the stylus. Typically, the change in transmission frequency and/or the encoded information is detected and decoded by the digitizer system.

According to some embodiments of the present invention, the controller provides for encoding additional information on the signal transmitted by the stylus and/or for altering characteristics of the signal for example in response to commands received during a receive mode of the stylus. Optionally, encoded information can be one or more of digital and analog encoding. Optionally, pressure information and/or additional information are provided in response to a command received by the stylus. Additional information includes for example, stylus ID, button state of user controlled buttons on the stylus, battery condition and calibration information.

According to some embodiments of the present invention, the stylus is operated with a digitizer system that includes a conductive ring and/or coil through which an AC signal is transmitted to generate a magnetic flux. Typically, the magnetic flux generated is adapted to be strong enough to be picked-up by the resonant circuit of the stylus when positioned over the digitizer sensor but is not adapted to power and/or sufficiently power transmission of the stylus. Since the magnetic flux generated is not required to power transmission of the stylus, dimension of a conductive wire or trace required to form the conductive ring is significantly less than that required for example in prior art system disclosed in incorporated U.S. Pat. No. 7,292,229. Typically, the conductive ring can be pattern on a same substrate as the digitizer sensor and/or with conductive material that is similar that that used for conductive lines of the digitizer sensor. In some exemplary embodiments, the conductive ring is formed to at least substantially surround the digitizer sensor.

According to some embodiments of the present invention, a controller of the digitizer system controls transmission through the conductive ring and uses the transmission to prompt stylus detection. Typically, the controller synchronizes stylus detection with transmission through the conductive ring. In some exemplary embodiments, the controller of the digitizer system imposes signal modulation using any modulation method, such as amplitude modulation (AM), On/Off keying (00K), phase modulation (PM) or others modulation methods, for conveying commands or other input, to be received by the stylus.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Referring now to the drawings, FIG. 1 illustrates a simplified block diagram of a computing device including a digitizer system in accordance with some embodiments of the present invention. According to some embodiments of the present invention, a computing device 100 includes a display screen 45 that is integrated with a digitizer sensor 50. In some exemplary embodiments, digitizer sensor 50 is a grid based capacitive sensor formed from conductive strips 51 that are operative to detect both input by stylus 44 transmitting an electromagnetic signal and/or input by one or more fingertips 46 or other conductive objects. According to some embodiments of the present invention, transmission of a signal from a stylus 44 positioned over and/or in the vicinity of sensor 50 is triggered by a magnetic flux generated in a conductive ring 26. According to some embodiments of the present invention, digitizer circuitry 25 sends a triggering signal to conductive ring 26 to generate a magnetic flux that will prompt stylus 44 to transmit an AC signal. Optionally, stylus 44 only transmits a signal when prompted. Optionally, this feature helps save power while maintaining the stylus in an operative condition. According to some embodiments of the present invention, stylus 44 includes a resonance LC circuit with a frequency that optionally matches the frequency transmitted on conductive ring 26. Typically, conductive ring 26 is formed from 1-10 loops. Typically, conductive ring 26 is patterned around conductive strips 51 and/or around a perimeter of sensor 50. In some exemplary embodiments, circuitry 25 includes a stylus control unit 85, e.g. a functional unit for controlling operation and detection of the stylus 44. According to some embodiments of the present invention, stylus control unit 85 is operative to synchronize detecting input from the stylus on conductive strips 51 with generation of the magnetic flux with conductive ring 26. Optionally, material similar to that used for runners that connect conductive lines 51 to digitizer circuitry 25 is used to pattern conductive loop and/or ring 26.

According to some embodiments of the present invention, stylus control unit 85 is operative to impose modulations on the signal transmitted on conductive ring 26 using any suitable modulation method, such as amplitude modulation (AM), On/Off keying (OOK), phase modulation (PM) or others, for conveying commands or other information, to be received by the stylus. For example the commands may relate to input required from the stylus such as pressure, to the frequency in which the stylus is to receive or transmit signals, a request to receive any information stored in or available to the stylus, frequency hoping for noise immunity double check on a received signal or the like. One of the commands can also be used as a trigger for the stylus transmitter or as an on/off switch.

Typically, stylus control unit 85 is also operative to prompt detection of the stylus signal on conductive strips 51 after termination (or a predetermined delay after the initiation) of transmission of the signal through conductive ring 26, e.g. after a pre-defined delay. The delay may also take into account the charging time of components of the stylus.

Optionally, a mutual capacitance detection method and/or a self-capacitance detection method are applied for sensing input from fingertip 46. Typically, during mutual capacitance and self-capacitance detection, digitizer circuitry 25 is required to send a triggering pulse and/or interrogation signal to one or more conductive strips 51 of digitizer sensor 26 and to sample output from the conductive strips in response to the triggering and/or interrogation. In some embodiments, some or all of conductive strips 51 along one axis of the grid based sensor are interrogated simultaneously or in a consecutive manner, and in response to each interrogation, outputs from conductive strips 51 on the other axis are sampled. This scanning procedure provides for obtaining output associated with each junction of the grid based sensor 50. Typically, this procedure provides for detecting one or more conductive objects, e.g. fingertip 46 touching and/or hovering over sensor 50 at the same time (multi-touch).

Typically, output from digitizer circuitry 25 is reported to host 22. Typically, the output provided by digitizer circuitry 25 includes coordinates of a stylus 44 and/or coordinates of one or more fingertips 46 interacting with digitizer sensor 50. Optionally, digitizer circuitry 25 additionally reports a hover or touch state for stylus 44 and/or fingertip(s) 46. Optionally, digitizer circuitry 25 additionally identifies coordinates as originating from stylus 44 or fingertip 46. Optionally, digitizer circuitry 25 additionally reports pressure applied on a tip of stylus 44. Typically, digitizer circuitry 25 uses both analog and digital processing to process signals and/or data picked up from sensor 50. Optionally, some and/or all of the functionality of digitizer circuitry 25 are integrated and/or included in host 22.

Digitizer systems that are similar to digitizer sensor 50 with digitizer circuitry 25 are described with further details, for example in U.S. Pat. No. 6,690,156 entitled "Physical object location apparatus and method and a graphical display device using the same", U.S. Pat. No. 7,292,229 entitled "Transparent Digitiser", the contents of the three patents are incorporated herein by reference and/or in U.S. Pat. No. 7,372,455 also incorporated herein by reference.

Optionally, digitizer sensor 50 is alternatively an in-cell, on-cell, out-cell, transparent sensor or any other non-capacitive sensor technology, including but not limited to resistive, IR, ultrasonic, optical, or the like.

Figure 2:
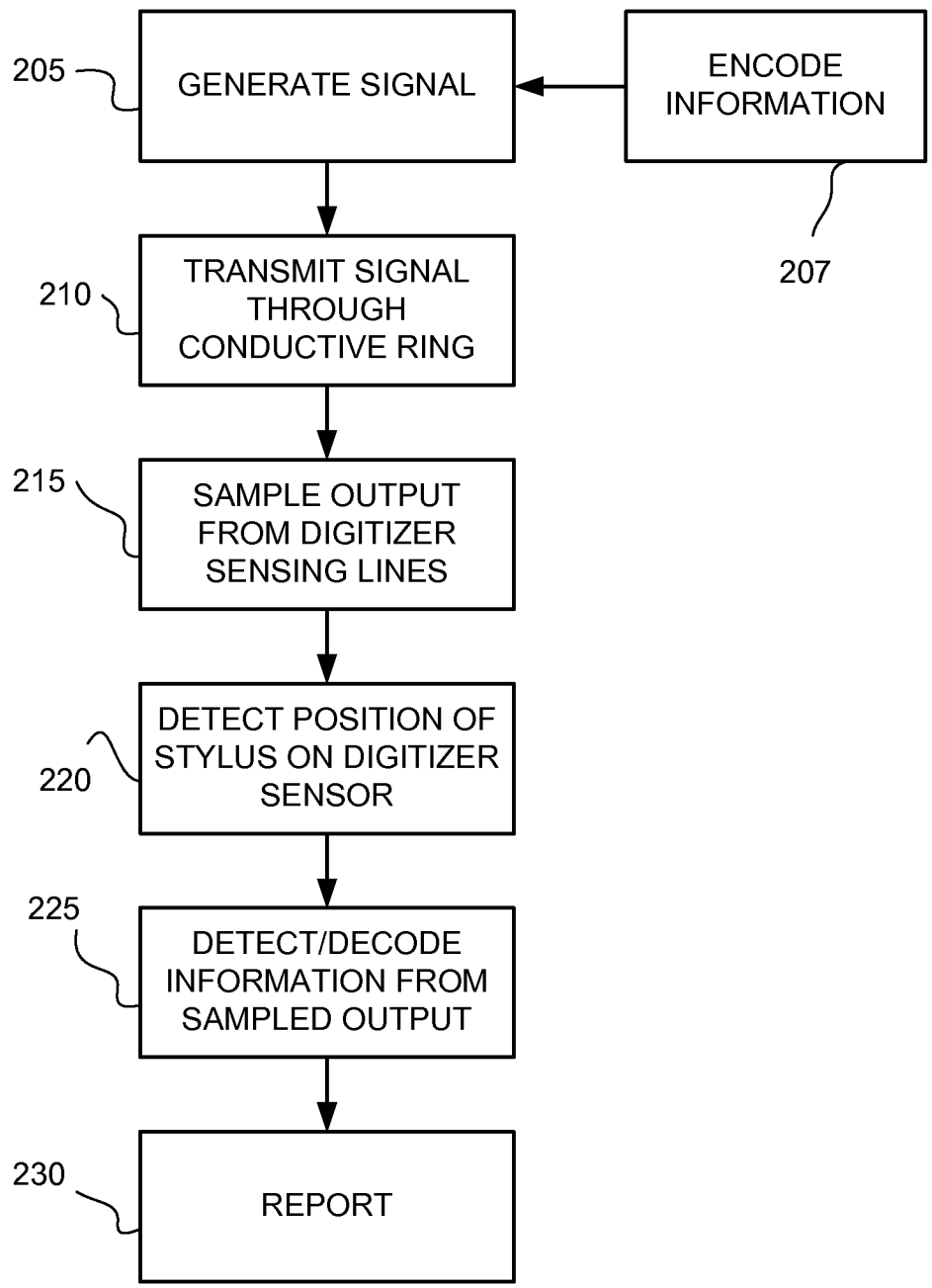
FIG. 2 is a simplified flow chart of an exemplary method for operating a digitizer system in accordance with some embodiments of the present invention.

Reference is now made to FIG. 2 showing a simplified flow chart of an exemplary method for operating a digitizer system in accordance with some embodiments of the present invention. According to some embodiments of the present invention stylus control unit 85 controls generation of an AC signal to be transmitted on conductive ring 26 (block 205). Optionally, the signal generated is encoded with information that is to be decoded and/or detected by stylus 44 (block 207). Optionally, the encoded information includes a command for stylus 44 to perform frequency hopping to avoid transmitting or change transmitted frequency in a noise environment. Optionally, digitizer circuitry 25 detects the noise environment and reports to stylus control unit 85. Optionally, the encoded information includes a command for stylus 44 to transmit a double burst, e.g. at two different frequencies. Optionally, the double burst allows the digitizer system to select a frequency for detection that is less noisy. Optionally, the encoded information includes a command for stylus 44 to stop transmitting a pressure sensing signal and/or a command to transmit specific information, e.g. button status, battery condition, and/or stylus ID, pen color. Optionally, the encoded information includes a command for stylus 44 to refrain from modulating the signal so that a drift in the capacitor can be detected. Optionally, in response to sensing a drift in the capacitor, stylus control unit 85 transmits a command defining compensation for the drift. Typically, controller 320 includes memory and/or is associated with memory for storing parameters for stylus operation.

According to some embodiments of the present invention, the generated signal is transmitted on conductive ring 26 for generating the magnetic flux (block 210). According to some embodiments of the present invention, stylus control unit 85 initiates sampling outputs from conductive strips 51 of digitizer sensor 50 at a defined period after transmission of the AC signal on conductive ring 26 (block 215). According to some embodiments of the present invention, sampled output is used to detect position of the stylus, e.g. a writing tip of the stylus on or near digitizer sensor 50. In some exemplary embodiments, the output is further processed to detect and/or decode information included in the signal transmitted by stylus 44, e.g. pressure, button status, stylus ID and battery condition. According to some embodiments of the present invention, coordinates of stylus 44 and optionally additional information is reported to host 22.

Reference is now made to FIG. 3 showing a simplified block diagram of an exemplary stylus including a pressure sensor with analog output in accordance with some embodiments of the present invention. According to some embodiments of the present invention, stylus 200 includes a power source 310, e.g. one or more rechargeable batteries and/or super capacitors, controller 320, one or more user controlled buttons 330, a variable capacitor 345 for sensing pressure on the tip (or tip displacement) and a resonant circuit 355 connected to variable capacitor 345. Optionally, resonant circuit 355 is also connected to selected optional components 351. According to some embodiments of the present invention, variable capacitor 345 changes its capacitance as a function of tip displacement as tip 350 moves against elastic component 360. Optionally, one plate 346 of a variable capacitor 345 is fixed to tip 350 and one or more opposing plates 347 are held stationary. During movement of tip 350, capacitance provided by capacitor 345 changes. Changes in variable capacitor 345 change frequency of resonance circuit 355. Typically, the changes in frequency are detected by the digitizer system and used to determine pressure level on tip 350. Side buttons 330 may be implemented by switching capacitors rather than by digital coding. According to some embodiments of the present invention, one pole of the resonant circuit is connected to a conductive portion of tip 350 and a second pole is connected to a conductive portion 385 of housing 380.

According to some embodiments of the present invention, an electric field is created in a gap formed between conductive portion 385 and conductive portion of tip 350 that is detected by digitizer sensor 50. According to some embodiments of the present invention, resonant circuit 355 is used to both receive a signal from a digitizer system, e.g. conductive ring 26 and to transmit a signal that can be picked up by digitizer sensor 50. According to some embodiments of the present invention, controller 320 controls switching the resonant circuit between receive and transmit mode. According to some embodiments of the present invention, controller 320 is also operative to modulate the signal transmitted by stylus 200 to include information, e.g. output from state of button 330 or other information. According to some embodiments of the present invention, controller 320 controls selectively connecting one or more components, e.g. capacitors to resonant circuit for modulating the output signal and/or for encoding digital code. Optionally, controller 320 controls switching on/off a plurality of different capacitors for encoding a digital signal, e.g. in a consecutive manner. Optionally, controller 320 disconnects variable capacitor 345 while transmitting a digital code.

It will be appreciated that side buttons 330 may also be implemented by switching another capacitor and affecting the resonance frequency rather than by digital coding.

Reference is now made to FIG. 4 showing a simplified block diagram of an exemplary stylus including a sensor with digital output in accordance with some embodiments of the present invention. According to some embodiments of the present invention, stylus 200 includes a power source 310, e.g. one or more rechargeable batteries, controller 320, one or more user controlled buttons 330, a writing tip displacement sensor 340 and a resonance circuit including variable components 352. According to some embodiments of the present invention, tip pressure sensor senses pressure of tip 350 as it moves against component 360, which may or may not be elastic. According to some embodiments of the present invention, one pole of the resonant circuit is connected to a conductive portion of tip 350 and a second pole is connected to a conductive portion 385 of housing 380. According to some embodiments of the present invention, an electric field is created in a gap formed between conductive portion 385 and conductive portion of tip 350 that is detected by digitizer sensor 50. According to some embodiments of the present invention, resonant circuit 352 is used to both receive a signal from a digitizer system, e.g. conductive ring 26 and to transmit a signal that can be picked up by digitizer sensor 50. According to some embodiments of the present invention, controller 320 controls switching the resonant circuit between receive and transmit mode.

According to some embodiments of the present invention, controller 320 is also operative to modulate the signal transmitted by stylus 200 to include information, e.g. output from tip displacement sensor 340 and or state of button 330. According to some embodiments of the present invention, controller 320 controls selectively connecting one or more components, e.g. capacitors to resonant circuit for modulating the output signal and/or for encoding digital code. Optionally, controller 320 controls switching on/off a plurality of different capacitors for encoding a digital signal.

Figure 5:
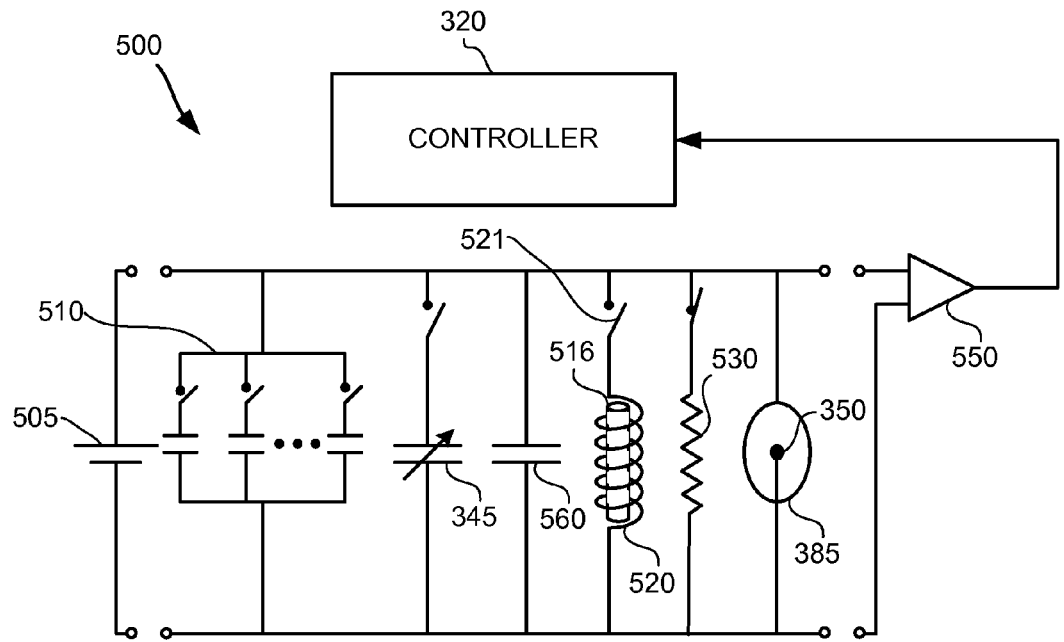
FIG. 5 is a simplified circuit diagram of an exemplary resonant transceiver powered with a voltage source in accordance with some embodiments of the present invention.

Reference is now made to FIG. 5 showing a simplified circuit diagram of an exemplary resonant transceiver powered with a voltage source, which may be used in a stylus such as the styluses of FIGS. 3 and 4 above, in accordance with some embodiments of the present invention. According to some embodiments of the present invention, resonant circuit 500 includes an inductor 520 optionally including a ferrite core 516, and a capacitor 560. According to some embodiments of the present invention, one pole of capacitor 560 is connected to a conductive portion 385 of a stylus housing and the other pole is connected to a conductive portion of tip 350. According to some embodiments of the present invention, controller 320 is operative to connect and then disconnect one or more additional components to the resonant circuit. Optionally, controller 320 selectively connects a variable capacitor 345, e.g. for sensing tip displacement and/or pressure. Optionally, controller 320 selectively connects one more capacitors 510 in turn to resonant circuit 500 to include coded information in the output of resonant circuit 500. Optionally, controller 320 selectively connects a resistor 530 to the circuit, in order to control the Q factor of the resonant circuit, if required. Typically, added resistance reduces the Q factor and a tradeoff between sensitivity to frequency and amplitude of signal produced by the circuit needs to be considered.

According to some embodiments of the present invention, controller 320 connects a differential amplifier 550 to resonant circuit 500 during a receive mode and detects output of differential amplifier 550 to identify a signal received. Typically, controller 320 samples output from differential amplifier 550 and optionally processes the output to decode any information that may be embedded in the received signal. According to some embodiments of the present invention, before transmission can start, a voltage source 505 is connected to resonant circuit 500 for loading voltage to the capacitor. Typically, when voltage source 505 is used to power transmission, inductor 520 is connected to the resonant circuit with a switch 521 controlled by controller 320.

Figure 6:
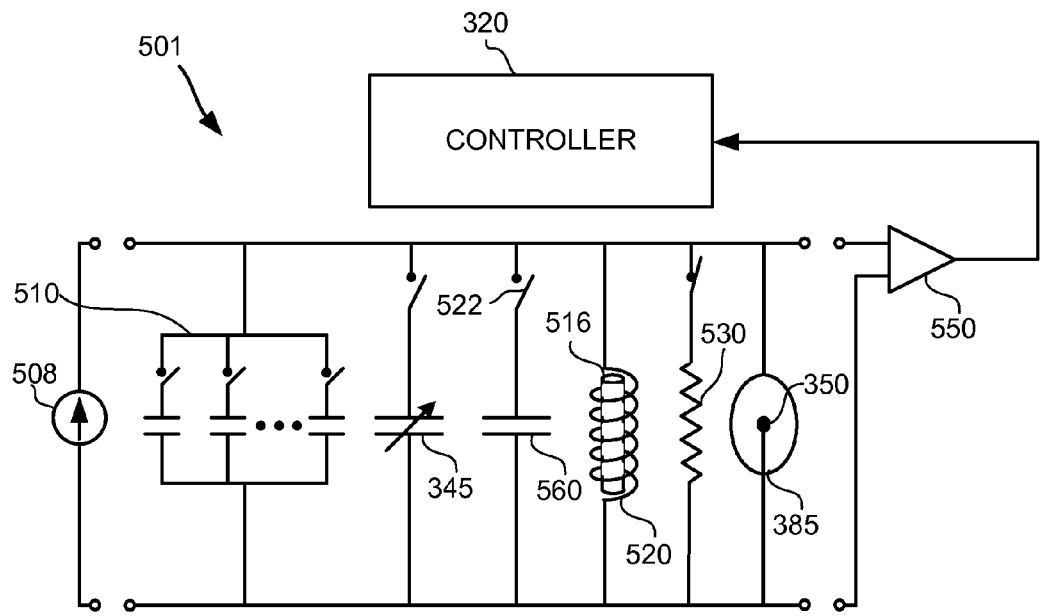
FIG. 6 is a simplified circuit diagram of an exemplary resonant transceiver powered with a current source in accordance with some embodiments of the present invention.

Reference is now made to FIG. 6 showing a simplified circuit diagram of an exemplary resonant transceiver powered with a current source in accordance with some embodiments of the present invention, which may be used in a stylus such as the styluses of FIGS. 3 and 4 above. Typically, components and operation of resonant circuit 501 are similar to that of resonant circuit 500 described in FIG. 5 however, in resonant circuit 501 a current source 508 replaces voltage source 505 (FIG. 5). Typically, when current source 508 is used to power transmission, capacitor 560 is connected to the resonant circuit with a switch 522 controlled by controller 320 instead of inductor 520. According to some embodiments of the present invention, before transmission can start, a current source 508 is connected to inductor 520 for loading current to the inductor.

Figure 7:
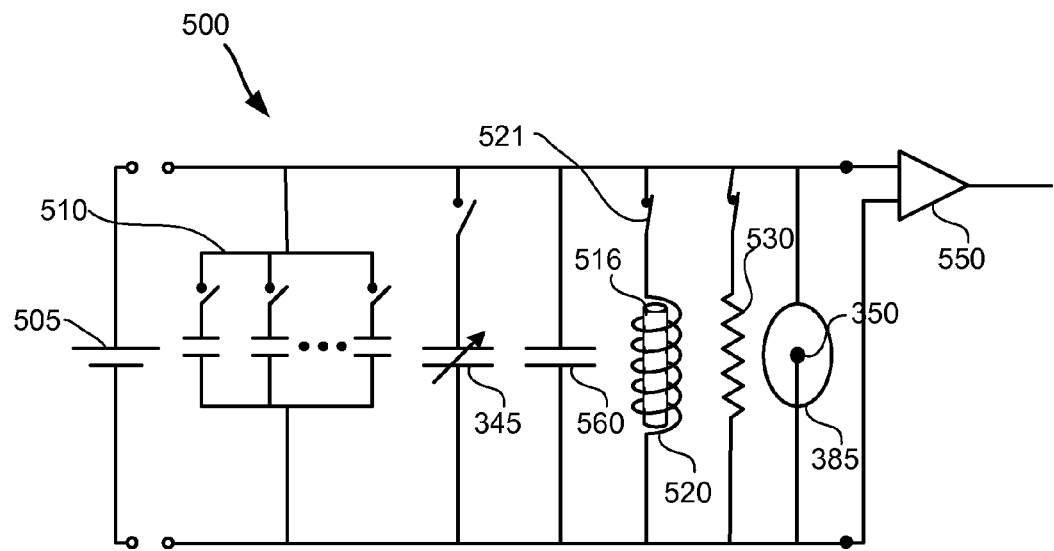
FIG. 7 is a simplified circuit diagram of an exemplary resonant transceiver in a receive mode in accordance with some embodiments of the present invention.

Reference is now made to FIG. 7 showing a simplified circuit diagram of an exemplary resonant transceiver, which may be used in a stylus such as the styluses of FIGS. 3 and 4 above, in a receive mode in accordance with some embodiments of the present invention. According to some embodiments of the present invention, during a receive mode of resonant circuit 500, controller 320 connects differential amplifier 550 to the resonant circuit comprising inductor 520, capacitor 560 and optionally some of capacitors 510, and disconnects voltage source 505. Typically, variable capacitor 345 is also disconnected during receive mode. Optionally, one or more capacitors in block 510 are connected to the resonant circuit to compensate for detected drift. Typically, controller 320 receives information from the digitizer system to compensate for a detected drift and in response controller 320 connects the relevant capacitors in block 510.

Figure 8:
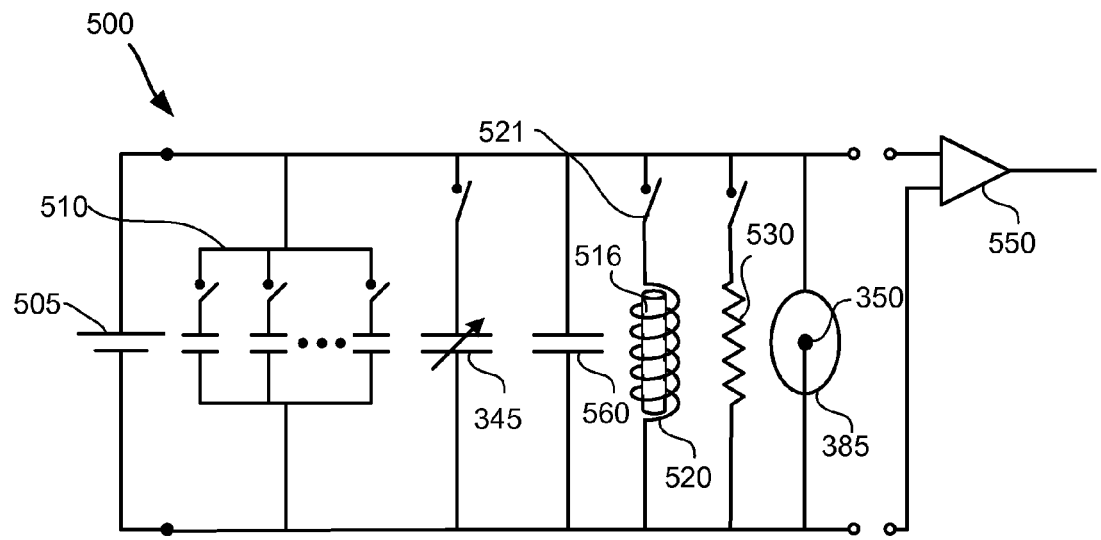
FIG. 8 is a simplified circuit diagram of an exemplary resonant transceiver powered by a voltage source during a transmit mode in accordance with some embodiments of the present invention.

Reference is now made to FIG. 8 showing a simplified circuit diagram of an exemplary resonant transceiver powered by a voltage source during a transmit mode, which may be used in a stylus such as the styluses of FIGS. 3 and 4 above, in accordance with some embodiments of the present invention. According to some embodiments of the present invention, during a transmit mode of resonant circuit 500, controller 320 connects voltage source 505 and disconnects differential amplifier 550 and inductor 520 from the power source. During this phase of the transmit mode capacitor 560 is charged for transmission. Optionally, one or more capacitors in block 510 are connected to the resonant circuit during this phase.

Figure 9:
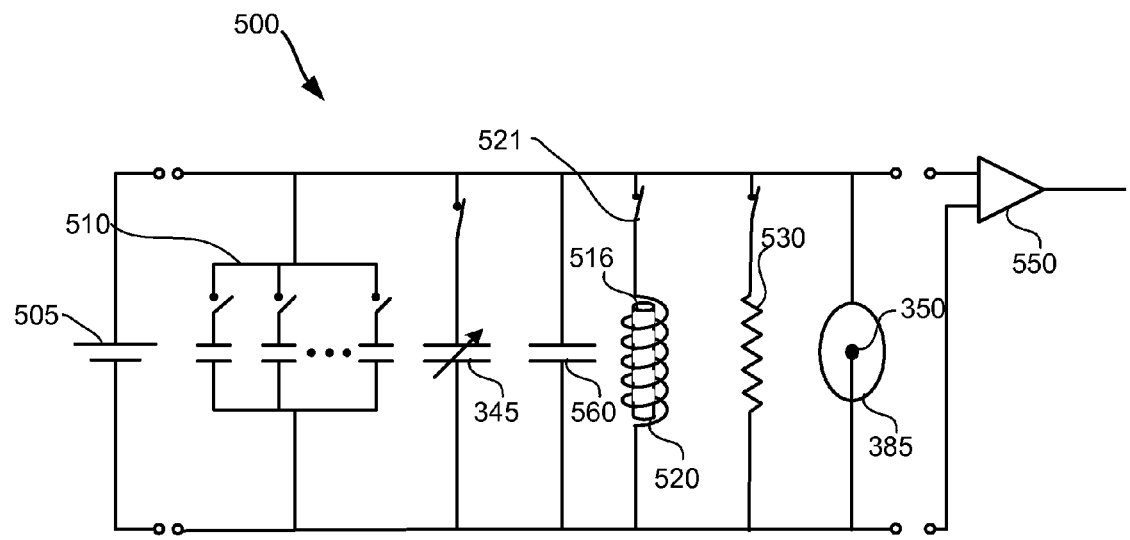
FIG. 9 is a simplified circuit diagram of an exemplary resonant transceiver during transmission of an analog pressure signal in accordance with some embodiments of the present invention.

Reference is now made to FIG. 9 showing a simplified circuit diagram of an exemplary resonant transceiver during transmission of an analog pressure signal in accordance with some embodiments of the present invention. According to some embodiments of the present invention, during a subsequent phase of transmit mode, e.g. once capacitor 560 is charged, controller 320 connects variable capacitor 345 and disconnects voltage source 505 to resonant circuit 500 and resonant circuit 500 begins to resonate and an electric field is created between tip 350 and conductive area 385 based on the inductive properties of inductor 520 and capacitance of capacitor 560 together with variable capacitor 345.

Figure 10:
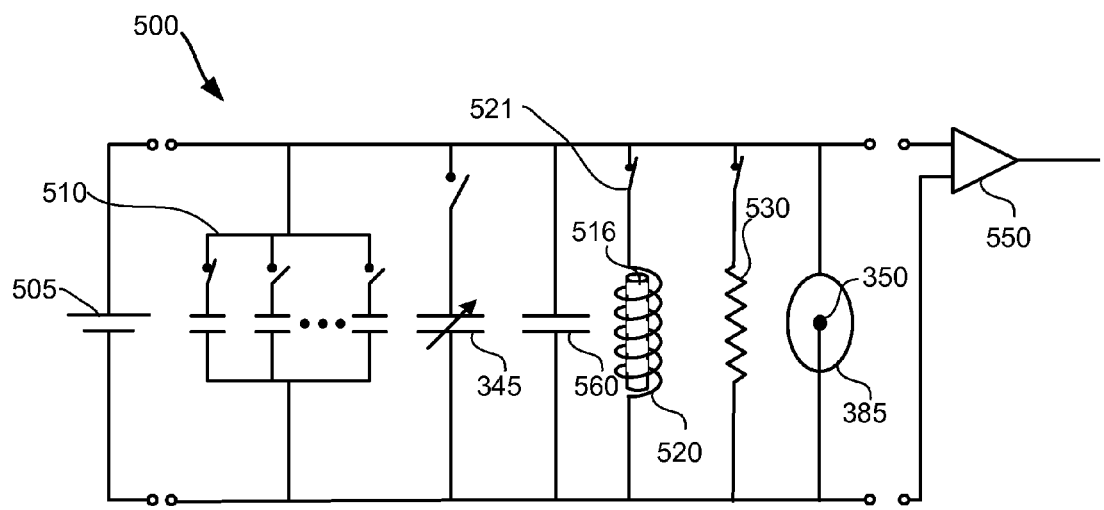
FIG. 10 is a simplified circuit diagram of an exemplary resonant transceiver during transmission of a digital encoded signal in accordance with some embodiments of the present invention.

Reference is now made to FIG. 10 showing a simplified circuit diagram of an exemplary resonant transceiver during transmission of a digital encoded signal which may be used in a stylus such as the styluses of FIGS. 3 and 4 above, in accordance with some embodiments of the present invention. According to some embodiments of the present invention, during a subsequent phase of transmit mode, e.g. once capacitor 560 is charged, controller 320 connects one or more capacitors in block 510 and disconnects voltage source 505 to resonant circuit 500 and resonant circuit 500 begins to resonate and an electric field is created between tip 350 and conductive area 385 based on the inductive properties of inductor 520 and capacitance of capacitor 560 together with connected to possible different combinations of capacitors in block 510. Typically, controller 320 changes the capacitors in block 510 that are connected during transmission to produce a digital code.

Figure 11:
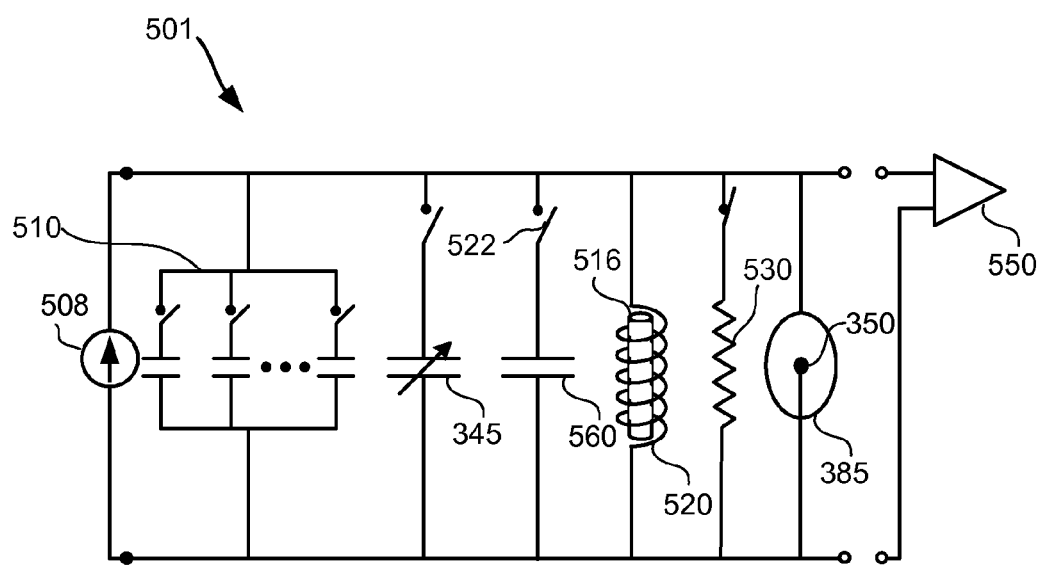
FIG. 11 is a simplified circuit diagram of an exemplary resonant transceiver powered by a current source during a transmit mode in accordance with some embodiments of the present invention.

Reference is now made to FIG. 11 showing a simplified circuit diagram of an exemplary resonant transceiver powered by a current source during a transmit mode, which may be used in a stylus such as the styluses of FIGS. 3 and 4 above, in accordance with some embodiments of the present invention. According to some embodiments of the present invention, during a transmit mode of resonant circuit 501, controller 320 connects current source 508 and disconnects differential amplifier 550 and capacitor 560 to the resonant circuit 501. During this phase of the transmit mode inductor 520 is charged for transmission. Once inductor 520 is charged, controller 320 disconnects current source 508 and resonance is initiated.

It will be appreciated that variable capacitors 510 may be implemented as array of capacitors connected in parallel. In some embodiment, the capacitor values increase in multiplications of 2 (for example 500 fF, 1 pF, 2 pF, etc.), such that all possible values may be achieved, with the resolution of the smallest value.

Figure 12:
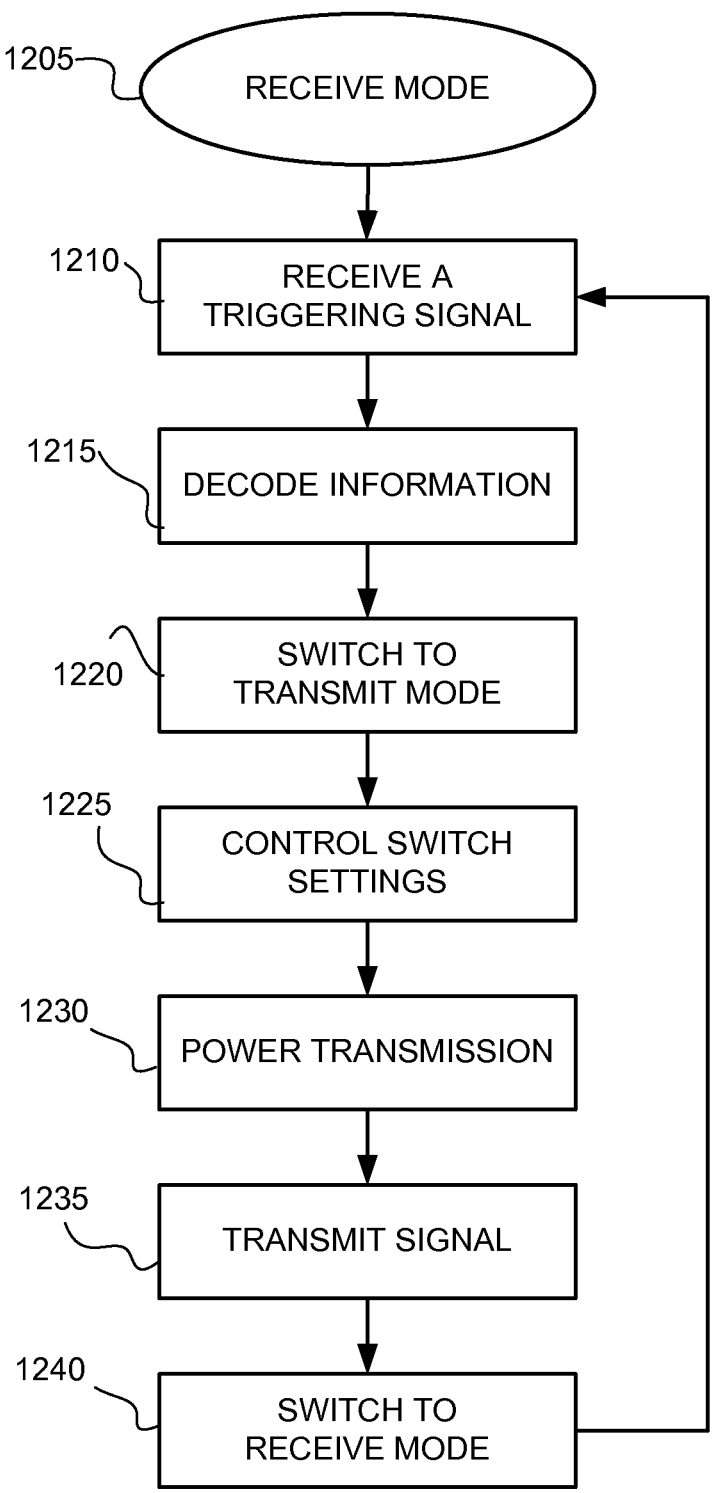
FIG. 12 is a simplified flow chart of an exemplary method for operating a stylus in accordance with some embodiments of the present invention.

Reference is now made to FIG. 12 showing a simplified flow chart of an exemplary method for operating a stylus in accordance with some embodiments of the present invention. According to some embodiments of the present invention, a controller of a stylus maintains the stylus in a receive mode (block 1205) as long as a valid signal is not detected by the resonant circuit, e.g. a synchronization signal, triggering signal and/or command signal. According to some embodiments of the present invention, the stylus is operative to receive a signal transmitted by digitizer system, e.g. a synchronization signal, triggering signal and/or command signal (block 1210). Optionally, once the received signal is verified by the controller of the stylus, the signal is processed to decode any information included in the signal (block 1215). According to some embodiments of the present invention, the controller of the stylus switches to transmit modes (block 1220) and makes the necessary connection and disconnection of optional components as described herein (block 1225). Typically, the resonant circuit is first powered by a power source included in the stylus (block 1230). Once powered, resonance is initiated and the signal is transmitted (block 1235). It will be appreciated that a predetermined delay may be used by both the digitizer and the stylus to compensate for optional timing differences between different styluses or other variations. At the end of the transmission period, the controller switches the circuit back to a receive mode (block 1240).

The disclosed subject matter thus relates to a stylus comprising an LC couple, used to receive electro-magnetic field from a conductor line located on the digitizer sensor, and transmitting electrical field to be received by electrodes of the digitizer sensor, such that the digitizer sensor may obtain the location of the stylus relatively to the digitizer sensor.

The stylus may, in addition or instead of a component of the LC couple comprises a variable component the parameters of which may change due to pressure applied at the stylus. The pressure or a characteristic thereof may be encoded with the signal, such that the digitizer sensor or associated with the digitizer sensor may utilize the pressure level.

It will be appreciated that based for example on the signal received by the digitizer sensor or on the pressure level, the digitizer sensor may also determine whether the stylus touches the digitizer sensor or hovers above it.

The terms "comprises", "comprising", "includes", "including", "having" and their conjugates mean "including but not limited to".

The term "consisting of" means "including and limited to". The term "consisting essentially of" means that the composition, method or structure may include additional ingredients, steps and/or parts, but only if the additional ingredients, steps and/or parts do not materially alter the basic and novel characteristics of the claimed composition, method or structure.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

What is claimed is:

1. A stylus comprising:
   a power source configured to power generation of a second signal;
   a resonant circuit including a first capacitor and an inductor, the resonant circuit configured to alternate between receiving a first signal on the inductor by wireless communication and generating the second signal;
   a controller configured to operate the resonant circuit in a receive mode and to switch operation of the resonant circuit to a transmit mode based on receiving the first signal,
   wherein during the receive mode, the controller is configured to disconnect the resonant circuit from the power source, to sample output from the resonant circuit and to decode the sampled output, and
   wherein during the transmit mode, the controller is configured to connect the resonant circuit to the power source by wired connection to generate the second signal.

2. The stylus according to claim 1, wherein the controller is configured to control modulation of the second signal.

3. The stylus according to claim 1, comprising a plurality of capacitors, wherein the controller is configured to selectively connect one or more capacitors from the plurality to the resonant circuit.

4. The stylus according to claim 1, comprising a variable capacitor that varies based on displacement caused by pressure applied to a writing tip of the stylus.

5. The stylus according to claim 4, wherein the variable capacitor is connected to the resonant circuit by a switch controlled by the controller.

6. The stylus according to claim 1, comprising a differential amplifier and wherein the controller is configured to connect the differential amplifier to output of the resonant circuit during a receive mode of the circuit.

7. The stylus according to claim 1, comprising a voltage source for powering the resonant circuit and wherein the controller is configured to connect the voltage source to the resonant circuit during a transmit mode of the circuit.

8. The stylus according to claim 1, comprising a pressure sensor and wherein the controller is configured to encode the second signal with output detected from the pressures sensor.

9. The stylus according to claim 1, comprising a user actuated button and wherein the controller is configured to encode the second signal with information regarding the state of the button.

10. The stylus according to claim 1, wherein the controller is configured to decode information encoded on the first signal and to modulate the second signal based on the information decoded.

11. The stylus according to claim 1, wherein the power source is a battery.

12. The stylus according to claim 1, wherein the inductor is operated to both receive the first signal and transmit second signal.

13. A method for operating a stylus for operation with a digitizer system, the method comprising:
    providing a resonant circuit in a stylus;
    providing a power source in the stylus;
    operating the resonant circuit in a receive mode, wherein the power source is disconnected from the resonant circuit during the receive mode;
    sampling a first signal that is wirelessly received by the resonant circuit during the receive mode;
    switching operation of the resonant circuit to a transmit mode;
    powering the resonant circuit by connecting the resonant circuit to the power source by wired connection; and
    transmitting a second signal from the stylus during the transmit mode.

14. The method according to claim 13, comprising decoding information encoded in the first signal.

15. The method according to claim 14, comprising altering the frequency of transmission based on the information decoded from the first signal.

16. The method according to claim 14, comprising modulating the second signal based on the information.

17. The method according to claim 13, comprising modulating the second signal with information regarding a parameter of operation of the stylus.

18. The method according to claim 16, wherein the modulating includes digital encoding.

19. The method according to claim 16, wherein the modulating is achieved by adding capacitance to the resonant circuit.

20. The method according to claim 13, comprising adding capacitance to the resonant circuit in response to detected drifting due to temperature changes.

* * * * *